United States Patent [19]

Barda et al.

[11] Patent Number: 5,058,240
[45] Date of Patent: Oct. 22, 1991

[54] COMPOSITE INERTIA LATCH FOR VEHICLE SEAT BACK

[75] Inventors: Rudolph C. Barda; Berno Engels, both of Battle Creek, Mich.

[73] Assignee: Keiper Recaro, Inc., Battle Creek, Mich.

[21] Appl. No.: 367,978

[22] Filed: Jun. 19, 1989

[51] Int. Cl.$^5$ .............................................. E05D 11/10
[52] U.S. Cl. ...................................... 16/325; 297/398; 16/333
[58] Field of Search .................. 16/324, 325, 333, 341, 16/343, 349; 297/378, 379

[56] References Cited

U.S. PATENT DOCUMENTS

| | | | |
|---|---|---|---|
| 2,236,351 | 3/1941 | Krakayer | 16/333 |
| 3,628,831 | 12/1971 | Close | 297/379 |
| 4,188,684 | 2/1980 | Pennec | 16/333 |
| 4,634,182 | 1/1987 | Tanaka | 297/379 |
| 4,655,501 | 4/1987 | Ishigami et al. | 16/333 |
| 4,707,010 | 11/1987 | Croft et al. | 297/379 |
| 4,919,482 | 4/1990 | Landis et al. | 297/379 |

Primary Examiner—Richard K. Seidel
Assistant Examiner—Edward A. Brown
Attorney, Agent, or Firm—Lloyd M. Forster

[57] ABSTRACT

Seat hinge for two door vehicle including a yieldable pivoted latch permitting forward seat back tilting to facilitate rear seat passenger entrance and exit without manual latch release and an inertia element responsive to vehicle deceleration for blocking latch release.

7 Claims, 2 Drawing Sheets

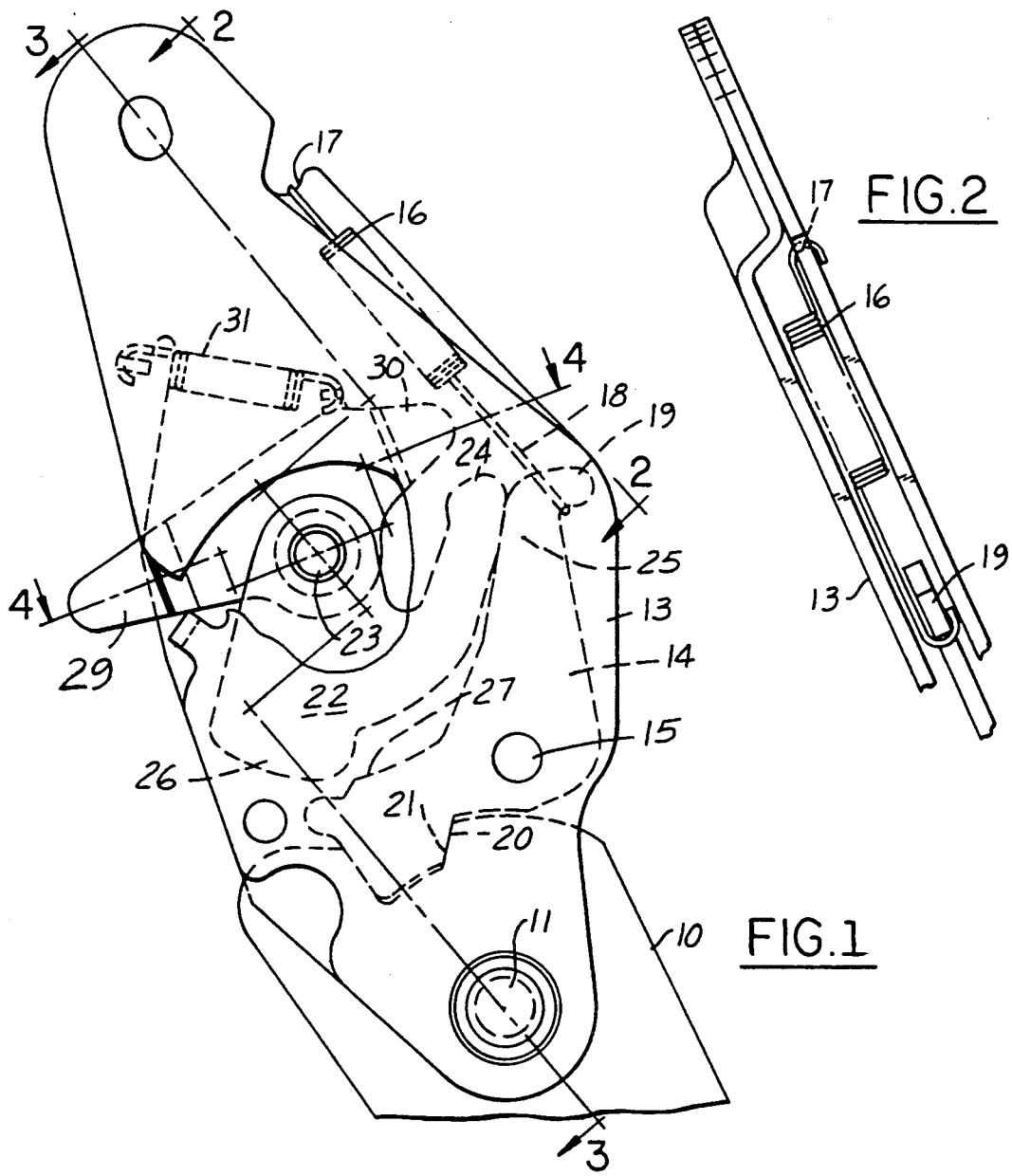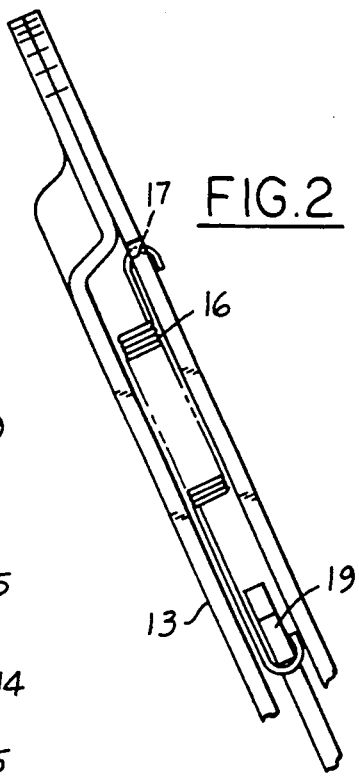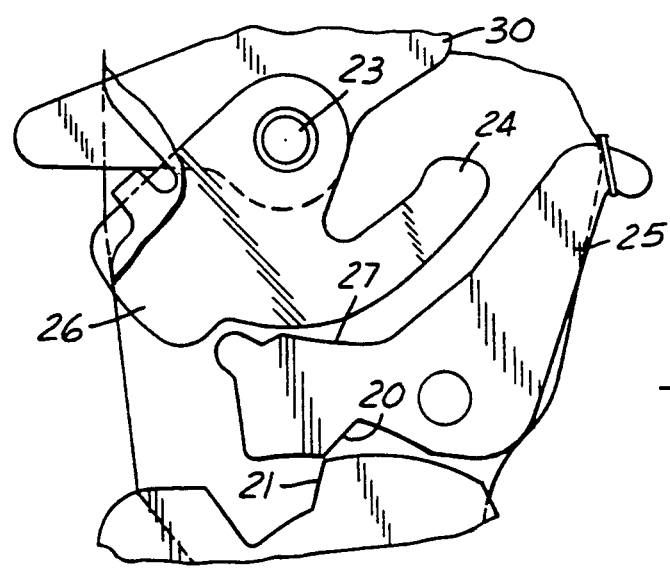

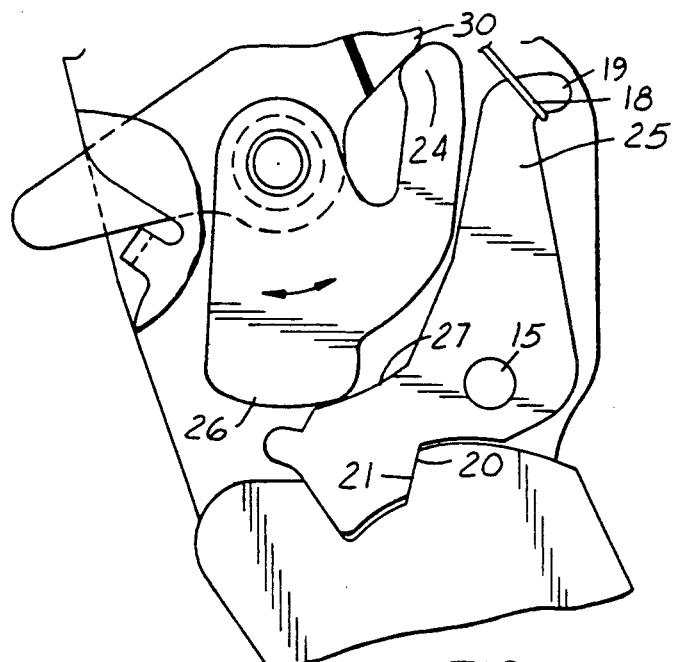
FIG.1B
FIG.1C
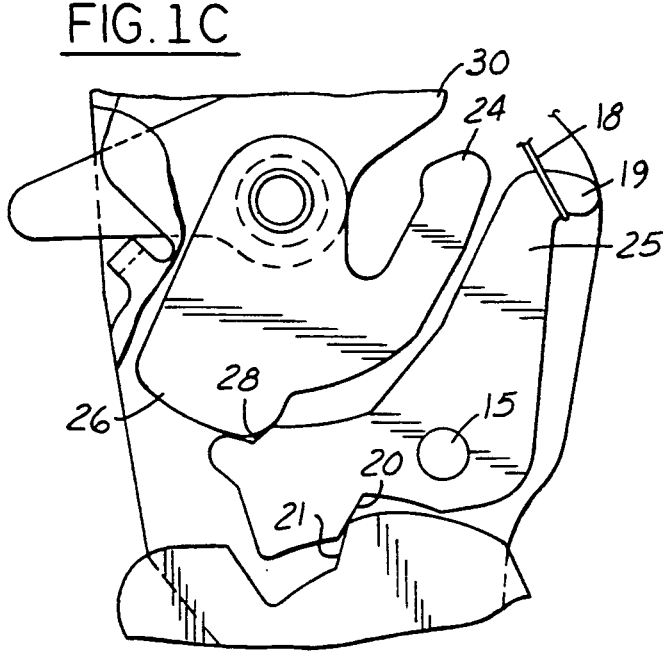
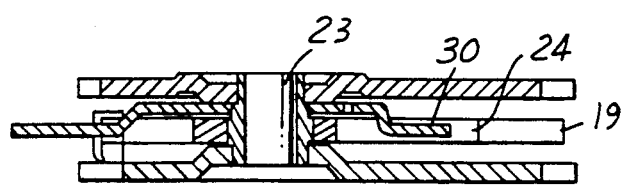
FIG.4
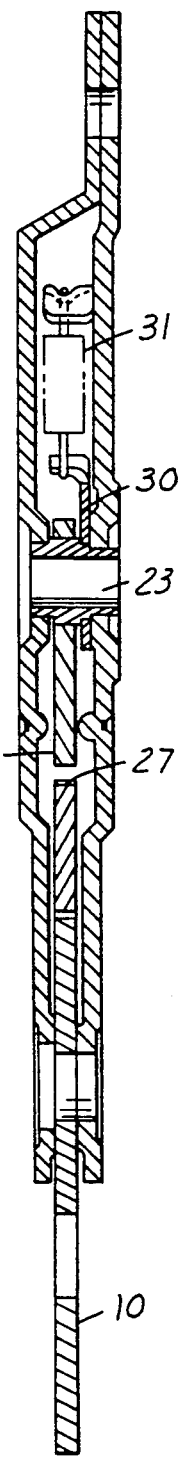
FIG.3

COMPOSITE INERTIA LATCH FOR VEHICLE SEAT BACK

BACKGROUND OF THE INVENTION

Inertia latch systems are known in the art for two-door passenger vehicles wherein the seat back may be moved forwardly to accommodate passenger entrance and exit without the need for actuating any manual release lever, subject however to an inertia element locking the seat back against forward movement in response to accident or emergency deceleration thereby preventing the seat back and any rear passenger from inertia propulsion against the driver or front seat occupant.

The inertia element in such systems is preferably positioned in a latching attitude in response to seat back return to its normal position, subject to being freed for gravity actuation to a release position by initial forward seat back movement, but also being subject to retention in a latching attitude by inertia incident to a predetermined rate of deceleration such as encountered in an accident or emergency braking.

Examples of such prior art systems employ an inertia element pivotally mounted on the seat back with a forward projection held in a latching attitude relative to an abutment stop mounted on the seat until initial forward movement of the seat back permits gravity to actuate the inertia element to a nonlatching attitude. Inertia forces on the center of gravity in a horizontal direction are effective to hold the inertia element in latching attitude under predetermined deceleration values. Such systems are shown in U.S. Pat. Nos. 4,165,128 issued Aug. 21, 1979; 4,223,946 issued Sept. 23, 1980; 4,438,974 issued Mar. 27, 1984; 4,469,375 issued Sept. 4, 1984; and 4,619,031 issued Oct. 28, 1986.

In some systems, an inertia element is mounted on the seat with a projection adapted to engage an element mounted on the seat back, for example, as disclosed in U.S. Pat. No. 4,402,747 issued Sept. 6, 1983; in some cases, composite elements are employed for the inertia latch as in U.S. Pat. No. 4,429,919 issued Feb. 7, 1984; and in some cases spring elements have been employed to supplement inertia effects on the inertia element as in U.S. Pat. No. 4,358,155 issued Nov. 9, 1982 and 4,366,984 issued Jan. 4, 1983.

In general, it is essential in the type of inertia latch under consideration, to provide sufficient lost motion to accommodate gravity displacement of the inertia element to a nonlatching clearance during initial forward tilting of the seat back while minimizing such lost motion, typically in the order of 7° to 8°, relative to effective latch engagement to arrest forward seat back tilting when required by sudden deceleration. A reduction in such lost motion for latch engagement is a recognized objective. It is also important that release of the inertia latch by gravity be effective when the car is parked on relatively steep grades and that the predominate effect of inertia in overcoming the gravity moment be reliable in all cases of deceleration exceeding a predetermined limit.

BRIEF DESCRIPTION OF THE PRESENT INVENTION

In the present disclosure, a latch element pivotally mounted on the seat back hinge bracket engages a positive stop retention recess in the seat bracket, under a spring bias, with contacting ramp surfaces normally providing pivotal rotation of the latch element to a release position in response to forward seat back tilting. Such ramp surface actuation is blocked by an inertia element in response to a predetermined rate of deceleration. In the absence of vehicle deceleration, the inertia element is permitted to pivot under gravity actuation to unblocking position in response to initial seat back tilting. An extension of the latch element engages an extension of the inertia element upon return of the seat back to normal position in order to restore a blocking attitude of the inertia element relative to the latching element. Lost motion in blocking engagement of the inertia element with the latch element is taken up by deceleration imposed pivoting of the inertia element substantially eliminating or greatly reducing initial seat back tilting prior to reaching an effectively blocked position.

BRIEF DESCRIPTION OF THE DRAWINGS

FIG. 1 is a side elevation of a recliner hinge equipped with the present inertia latch system shown in normal condition;

FIG. 1A is a fragmentary view showing the inertia and latching elements displaced to allow forward seat back tilting;

FIG. 1B is a fragmentary view showing the inertia element displaced to full blocking position;

FIG. 1C is a fragmentary view showing the inertia element in a "fail safe" blocking condition;

FIG. 2 is a sectional view taken along the line 2—2 of FIG. 1;

FIG. 3 is a sectional view taken along the line 3—3 of FIG. 1;

FIG. 4 is a sectional view taken along the line 4—4 of FIG. 1.

DETAILED DESCRIPTION OF PREFERRED EMBODIMENT

With reference to the drawings, seat bracket 10 mounted on a vehicle seat, not shown, is pivotally connected at 11 to back bracket 13, mounted on a seat back, not shown. Latch element 14 pivotally mounted at 15 to bracket 13 is biased by tension spring 16 anchored at 17 to bracket 13 with extension 18 engaging latch extension 19 urging latch 14 into counterclockwise engagement of latch ramp surface 20 with notch ramp surface 21 at the top end of bracket 10. Inertia element 22 pivotally mounted at 23 to seat back bracket 13 is normally held in the position shown by contact of inertia element extension 24 with latch extension 25 so that projection 26 is in close proximity to a blocking position relative to latch surface 27.

With the vehicle stationary, initial forward tilting of seat back bracket 13 causes ramp surfaces 20, 21 to rotate latch 14 and its extension 25 in a clockwise direction permitting gravity to swing inertia element 22 to an unblocking position, shown in FIG. 1A, as forward seat back tilting continues. However, inertia incident to sudden deceleration will rotate inertia element 22 to its blocking position, as shown in FIG. 1B to lock the seat back against forward tilting.

In the event the inertia element fails to swing freely to the position of FIG. 1B upon sudden deceleration, due to abnormal frictional resistance or otherwise, a "fail safe" engagement as shown at 28 in FIG. 1C will prevent complete disengagement of ramp surfaces 20, 21 until manual release lever 29 is actuated to rotate inertia element 22 in a clockwise direction through engagement of knob 30 with extension 24 against the bias of tension spring 31.

The principal advantage of this combination of pivoted latch and inertia elements resides in the reduction of initial forward seat back movement upon sudden deceleration from conventional 7° to 8° to approximately 1° to 2° or less as shown in FIG. 1B.

We claim:

1. In a motor vehicle seat having a seat part and a back part, a hinge comprising, a lower hinge element fixed to said seat part, an upper hinge element fixed to said back part, first pivot means for pivotally connecting said upper hinge element to said lower hinge element including an engageable stop means, a first element (14) pivotally mounted on said upper hinge element normally engaged with said stop means in a first position capable of preventing forward seat back pivotal movement and including biasing means associated therewith for yieldable disengagement from said stop means through forward pressure on the seat back to permit forward seat back pivotal movement, an inertia element pivotally mounted on second pivot means on said upper hinge element with outer surface means (24) interengaging outer surface means (25) on said first element along respective first ends in said first position (FIG. 1) permitting said yieldable disengagement of said first element in response to said forward pressure on said seat back, said inertia element having a center of gravity offset from said second pivot means defining a blocking means responsive to gravity to pivotally move said inertia element in a first direction away from engagement with said first element during initial forward seat back movement with said vehicle stationary permitting unrestrained additional pivotal movement of said seat back (FIG. 1A), said blocking means also being responsive to inertia to overcome gravity and pivotally move said inertia element in a second opposite direction into blocking engagement with said first element along their outer surfaces at respective second ends (FIG. 1B) upon sudden deceleration of said vehicle wherein further pivotal movement of said seat back is substantially eliminated.

2. In the vehicle seat of claim 1, said engageable stop means including a ramp surface (21) having a matching profile with a ramp surface (20) of said first element, the ramp surfaces contacting each other during yielding disengagement of said first element with said stop means through said forward pressure on the seat back.

3. The vehicle seat of claim 2 wherein said ramp surface is provided in an outwardly open recess in said lower hinge element.

4. In the vehicle seat of claim 7, said biasing means is yieldable spring means to hold said first element in engagement with said stop means.

5. In the vehicle seat of claim 7, said outer surface means comprising contacting projections of said first and inertia elements effective to prevent rotation of said inertia element, said initial forward seat back movement causing disengagement of said projections to permit gravity actuation of said inertia element away from said first element in said first direction.

6. In the vehicle seat of claim 5, said blocking means on said inertia element moving into contact with said first element (FIG. 1B) upon sudden deceleration of said vehicle limiting forward seat back angular movement to about 1-2 degrees.

7. In the vehicle seat of claim 1, supplemental interengageable blocking surfaces of said first and inertia elements providing near blocking means in the absence of gravity actuation of said inertia element during said initial forward seat back movement upon sudden deceleration of the vehicle to arrest further forward seat back movement (FIG. 1C), and manually actuated release level means to move said inertia element to separate said supplemental interengageable blocking surfaces and permit seat back movement.

* * * * *